United States Patent [19]

Arnold

[11] Patent Number: 4,900,609
[45] Date of Patent: Feb. 13, 1990

[54] TWO-PLY BELTING MATERIAL

[75] Inventor: Brink Arnold, Anthony, Kans.

[73] Assignee: Morrison Company, Inc., Anthony, Kans.

[21] Appl. No.: 204,577

[22] Filed: Jun. 9, 1988

[51] Int. Cl.$^4$ .................. A01D 39/00; B30B 5/06; B32B 25/10; B65G 15/34; B65G 15/44
[52] U.S. Cl. .................................... 428/163; 56/341; 56/477; 56/DIG. 4; 100/88; 198/847; 198/957; 428/172; 428/212; 428/213; 428/229; 428/250; 428/252; 428/259; 428/409; 428/194
[58] Field of Search .................... 56/341, 477, DIG. 4; 100/88; 198/847, 957; 428/163, 172, 212, 213, 229, 250, 252, 259, 409, 194

[56] References Cited

U.S. PATENT DOCUMENTS

| | | |
|---|---|---|
| 4,371,580 | 2/1983 | Morrison et al. .................. 428/252 |
| 4,426,926 | 1/1984 | Soteropulos et al. .................. 100/88 |
| 4,518,647 | 5/1985 | Morrison .......................... 428/252 |
| 4,752,282 | 6/1988 | Habegger ........................... 428/252 |

Primary Examiner—James C. Cannon
Attorney, Agent, or Firm—Arnold, White & Durkee

[57] ABSTRACT

Two-ply belting having improved dimensional stability flexing characteristics and elongation characteristics is disclosed. The belting comprises a first synthetic fabric proximate to the friction rubber surface of said belting and a second synthetic fabric distal to the friction rubber surface. The modulus and flex fatique life of the first synthetic fabric is greater than the modulus and flex fatique life of the second synthetic fabric. Belting with accordance with this invention is useful in agricultural applications.

15 Claims, 1 Drawing Sheet

TWO-PLY BELTING MATERIAL

The present invention relates to belting and more particularly to belting having improved dimensional stability characteristics. Belting in accordance with the present invention is particularly useful in agricultural applications, e.g. hay balers, where environmental and loading conditions can be severe.

BACKGROUND OF THE INVENTION

Belting is used today in many types of agricultural machinery, e.g. hay balers. A popular type of hay baler which is marketed today employs a plurality of belts which are used to form the hay into round bales. This type of baler is known as a round hay baler. The belts which are used on the round hay balers are typically in the order of 40 feet in length.

There are several factors which must be taken into consideration when designing belting for hay balers. One factor is that when a hay baler is making bales, the belts are stretched to heavy loads. These loads cause the belts to stretch and the amount that the belt stretches under the load must remain within a certain tolerance; otherwise the bale it is making will become too large, which interferes with proper baler operation.

The amount of stretch in belts used on hay balers is substantial. For example, a typical maximum specification for elongation of belts for hay balers has been 3% at a specified load. A 40 foot belt is thus permitted to stretch up to about 14 inches under that load. When the belt stretches beyond tolerable limits, the belt is removed and shortened. Shortening the belt is typically accomplished by trial and error techniques, especially in the fields. Such trial and error techniques can produce unsatisfactory results.

Manufacturers of hay balers have continued to increase the specification for the density of bales which a baler can produce. The amount of loading to which the belts of the baler are subjected to make denser bales is increased and hence the likelihood that a belt will stretch by an amount beyond tolerable limits for proper operation is increased. Another factor to be considered in belt design is the ability of the belt to flex in operation without the ply material cracking. In that regard, a typical round hay baler employs a plurality of rollers on which the belts are installed. The position of the rollers is such that the belts are subjected to a substantial amount of flexing in traveling around the rollers. Moreover, some of the rollers are positioned such that the belts must travel in an S-shape during operation. If the belts fail due to the flexing stress, the belt must be replaced to obtain proper operation of the baler.

Another aspect of the flexing problem is manifested at the location where the belt is spliced. A popular way to connect the ends of the belt is with the so-called "clipper splice" as shown in FIG. 3. The likelihood of belt failure due to flexing is most pronounced at the location in the belt in the vicinity of the clipper splice. This is because the plies of the belt are most prone to crack at the splice.

Yet a third factor which must be considered in belt design is the environment in which the belting is used. Belts used on agricultural equipment are subjected to severe environmental conditions and in this regard moisture is perhaps the greatest problem. If the ply material of the belting is deteriorated by moisture, the belt can fail in operation. It is seen that belting for hay balers needs to be dimensionally stable, able to flex without cracking, and not subject to environmental deterioration.

One popular belt that has been used on hay balers is a two-ply belt wherein the plies are made of a polyamide fabric, e.g. nylon. Polyamide fabrics are used in belts for hay balers, inasmuch as they have excellent flexing characteristics and are not susceptible to moisture deterioration as other materials. However, the elongation problem in such belts is pronounced since the polyamide material has a relatively high elongation modulus and also tends to stretch when wet. One proposed solution to the elongation problem in two-ply polyamide belts has been to initially make the belts shorter than required in order to compensate for elongation. Under this proposed solution, the assumption is that all belts will stretch in use to the proper length. This approach is not really sound nor acceptable since all belts on the hay baler do not stretch an exact amount. Even though unacceptable, this approach has been utilized in the industry to account for the elongation problem.

Another suggested solution is the use of two polyester fabric layers, especially in connection with belts having a high coefficient of friction surface. These fabrics, however, have proven to be incapable of withstanding the continuous shock loading encountered in the hay baler. The shock loading is due to the high degree of weight variation of the material being fed into the baler and the tumbling of a large mass of material weighing between 400 and 3500 pounds. The load has a continually changing center of mass due to the variable densities of the centrifically tumbling material within the baler, which adds to the stress on the belting. Finally, the aggressiveness of the contact made between the high coefficiency of friction surface of the belt and the material being fed into the baler places additional stress on the fabrics.

There have been other suggestions to solve the elongation of stretching problem in belts. One such suggestion was to make a two-ply belt where the plys were made of a rayon material. Rayon has a lower elongation modulus than a polyamide fabric and hence does not stretch as much as a polyamide belt of the same load. However, this belt proved to be unacceptable since rayon is particularly susceptible to moisture attack.

Another suggestion for solving the elongation problem was to make a two-ply belt, wherein the plies were made of a polyester material. This proposed solution was ineffective inasmuch as the polyester plys tended to crack when flexed, and cracking was most pronounced in the area of the clipper splice.

Another type of belting which was used on the hay balers included a three-ply belt, wherein the center ply was made of a polyamide fabric and wherein the outer two plys were made of cotton. However, moisture caused the cotton to rot and the belt then failed since it was not able to carry a sufficient load.

Still another type of belting employing a three-ply belt described in U.S. Pat. No. 4,371,580, issued on Feb. 1, 1983. The center ply of the belt comprises a first synthetic fabric and each outer ply comprises a second synthetic fabric. The modulus and flex fatique life of the second fabric are respectively greater than the modulus and flex fatique life of the second synthetic fabric. In general, the center ply comprises a polyester fabric while the outer plies comprise a polyamide fabric. While the three-ply belting of the patent 4,371,580 overcomes the problems encountered with previous beltings, the manufacture of a three-ply belt is relatively expensive when compared with the traditional two-ply belts heretofore used in the industry.

SUMMARY OF THE INVENTION

In accordance with the present invention, belting is provided which exhibits superior dimensional stability characteristics; which is not subject to deterioration due to environmental conditions; which is able to flex in operation without cracking; and which is relatively inexpensive to produce. The belting is especially useful in hay balers wherein one outer rubber skim surface (high friction or baling surface) has a high coefficient of friction to help compact bales of hay. The other outer rubber skim (the low friction or driving surface) has a lower coefficient of friction and engages the driving machinery.

In accordance with the present invention two-ply belting material is provided wherein a first ply proximate to a first outer rubber skim ("high friction" or "baling" rubber skim) having a high friction surface comprises a first synthetic fabric; and wherein a second ply distal to the high friction rubber skim comprises a second synthetic fabric. The two plies are separated by a central rubber skim and the second ply also has a second outer rubber skim (the "low friction" or "driving" skim) bonded to it. The flex and fatique life and modulus of the first synthetic fabric are greater than the respective flex fatigue life and modulus of the second synthetic fabric. The use of fabrics having different elongation moduli reduces the amount the belt can stretch since the elongation is controlled by the modulus of the second ply fabric. The second synthetic fabric also has a greater hook retention and load bearing capability relative to the first synthetic material. The use of synthetic fabrics reduces susceptibility of the belt to moisture deterioration.

As noted above, the terms "high friction" or "high coefficient of friction" surface refers to the outer rubber surface of the belting which acts directly upon the hay material. The terms "low friction" or "driving" surface refer to the other outer rubber surface of the belting. The high friction surface is deliberately molded such that it has a coefficient of friction greater than the opposite outer surface. An example of such a high friction surface can be seen in U.S. Pat. No. 4,426,926.

The rubber surface skims of the belting of the invention are not of the same overall gauges. The high friction rubber surface skim is substantially greater in overall gauge than the low friction rubber surface skim. The center line of the load is maintained by predetermining the length of the belt by the length of the polyester fabric needed to circumnavigate the serpentine roller system of the hay baler in its most severe configuration. The high coefficient of friction rubber surface transfers energy from the moving belt to the infeed material of the hay baler. The second synthetic fabric provides a structural support for positive contact and energy transference along with mechanical fastener retention capabilities. The first synthetic fabric provides flexing stability under working loads while being bonded to the high friction rubber skim. The high friction rubber skim has an even greater modulus of elongation than the first synthetic fabric, the second synthetic fabric, or both fabrics bonded together but separated by a skim of rubber. With this approach the second ply is not flexed as much as the first ply and the likelihood that the second ply will crack is reduced.

DESCRIPTION OF THE SPECIFIC EMBODIMENTS

It will be appreciated that the present invention can take many forms and embodiments. Several embodiments of the invention are described so as to give an understanding of the invention. These embodiments herein described are intended to illustrate but not limit the invention.

Figure 1:
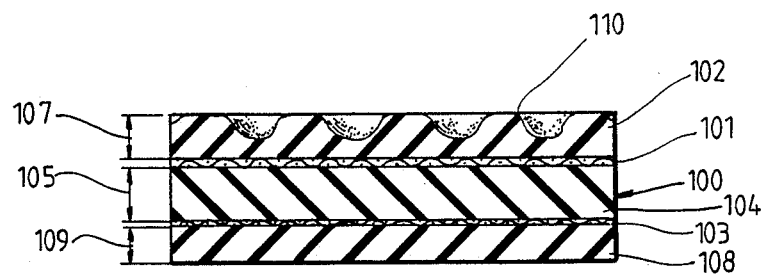
FIG. 1 is a cross sectional view of the belting in accordance with the present invention.

With reference to FIG. 1, the belting 100 includes a first ply 101 which comprises a first synthetic material, and is proximate to a first outer rubber skim 102 having a high coefficient of friction surface 110. The belting 100 also includes a second ply 103 which comprises a second synthetic material and located distal to the first outer rubber skim 102. The flex fatique life and elongation modulus of the first synthetic fabric of the first ply 101 are greater than flex fatigue life and elongation modulus of the second synthetic fabric of the second ply 103.

Interposed between the two plys 101, 103 is an inner rubber skim 104 having a thickness 105. The belting also has two outer rubber skims 102 and 108. The first rubber skim 102 having a high friction surface 110 with a thickness 107 and a second outer rubber skim 108 having a thickness 109. In this manner the second synthetic fabric 103 is the center line of travel and load bearing for the belt.

According to the present invention, the rubber skim 102 which forms the high coefficient of friction surface has a thickness which may vary in a range from a thickness between one and five times the thickness of the opposite outer skim 108. The thickness of the skim 108 can be from about 20 to 200 thousands of an inch. The thickness of the center rubber skim 105 should be at least twice the overall gauge of the outer skim 108.

According to conventional techniques, the fabric of the plies 101 and 103 are primed with resorcinol formaldehyde latex (RFL). The belting 100 is then "plied up" whereby the uncured rubber skims 104, 102 and 108 are placed in positions as shown in FIG. 1. The belting is then vulcanized. The RFL then causes bonding between the fabrics and the rubber skims during vulcanization. The belting material may then be cut to appropriate lengths and widths.

Figure 3:
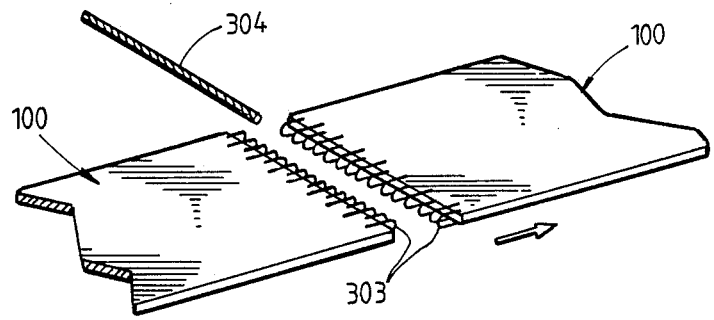
FIG. 3 is a perspective view of a clipper splice used for joining the ends of the belting of this invention together.

The ends of the belting may then be spliced together by using known techniques. One such technique is illustrated in FIG. 3 which is known as the so called "clipper lace" splice technique. With this technique, a plurality of metal eyelets or hooks 303 are connected in each end of the belting and a rod 304 or other suitable retaining material is passed through the eyelets. The ends of the rod 304 are suitably formed to prevent removal of the rod and to thereby keep the splice intact.

Figure 2:
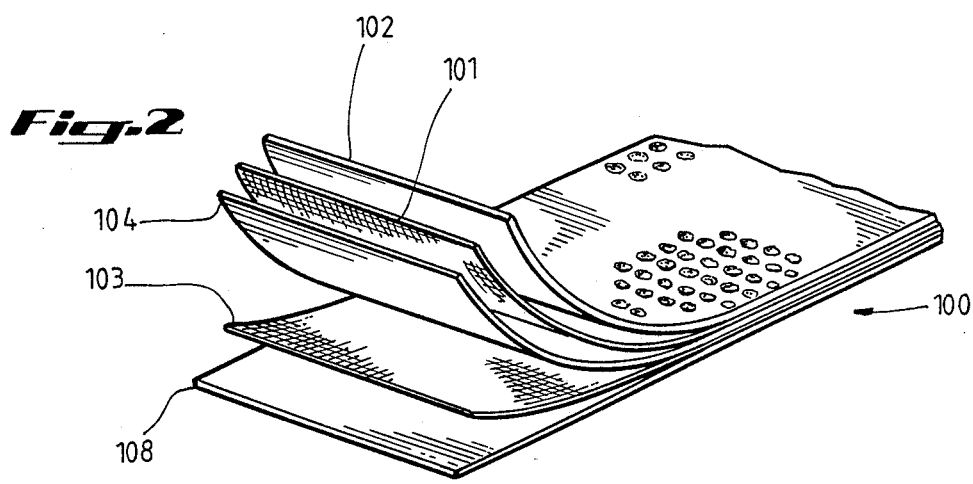
FIG. 2 is a perspective view partially exploded of belting in accordance with the present invention.

With reference to FIGS. 1 and 2, in one embodiment of the belting 100 of the present invention, the first ply 101 is a weave of both polyester and polyamide yarns with the polyester yarns forming the weft yarns of the first fabric and the polyamide yarns forming the warp yarns of the fabric. In the second ply 103, polyester yarns form both the weft and warp yarns of the fabric. As used herein, "warp" refers to the yarns running in a longitudinal direction along the belt and "weft" refers to yarns running in a direction transverse to the direction of the belt. In this embodiment, the polyester yarn used is preferably type 1W73 or 1W74, which is available from Allied Chemical Company. The polyamide yarn is preferably type 728 Nylon, which is available from DuPont.

Belting in accordance with this invention may be either cut-edge or capped-edge belting. With cut edge belting, the fabrics of the plies are exposed along the edges of the belt. With capped-edge belting, a "cap" of rubber material is bonded to the edges of the belt.

What is claimed is:

1. Two-ply belting material comprising:
a first high coefficient of friction outer rubber skim;
a first ply comprising a first synthetic fabric bonded to said first outer rubber skim;
an inner rubber skim bonded to the said first ply opposite said first outer rubber skim;
a second ply comprising a second synthetic fabric bonded to said inner rubber skim; said first ply having a greater flex fatigue life and modulus of elongation than said second ply and second ply having a greater load bearing capacity than said first ply ; and
a second outer rubber skim bonded to said second ply.

2. The belting of claim 1 wherein said second synthetic fabric comprises polyester warp and weft yarns and said first synthetic fabric comprises polyester weft and polyamide warp yarns.

3. The belting of claim 2 wherein said polyamide fabric comprises nylon.

4. The belting of claim 1 wherein said first synthetic fabric comprises polyamide yarn.

5. The belting of claim 1 wherein said second synthetic fabric comprises polyester.

6. The belting of claim 1 wherein the thickness of said inner rubber skim is at least twice the thickness of said second outer rubber skim.

7. The belting of claim 1 wherein the thickness of said first outer skim is between about 1 to 5 times the thickness of said second outer rubber skim.

8. The belting of claim 7 wherein said thickness of said second outer rubber skim is from about 20 to 200 thousandths of an inch.

9. The belting of claim 1 wherein the outer surface of said first outer rubber skim comprises a high coefficient of friction surface.

10. The belting of claim 1, 2, 3, 4, 5, 6, 7, 8 or 9 wherein the belting is cut-edge belting.

11. The belting of claim 1, 2, 3, 4, 5, 6, 7, , 8 or 9 wherein the belting is capped-edge belting.

12. Two-ply hay baler belting comprising:
a first ply comprising a first synthetic fabric;
a second ply comprising a second synthetic fabric, said second synthetic fabric having a flex fatigue life and modulus of elongation less than the flex fatigue life and modulus of elongation of said first synthetic fabric and second ply having a greater load bearing capacity than said first ply;
a first outer rubber skim having a high coefficient of friction outer surface, bonded to said first ply;
a second outer rubber skim having a thickness of from about 20 to 200 thousandths of an inch bonded to said second ply; and
an inner rubber skim interposed between said first and second plys having a thickness of at least twice the thickness of said second outer rubber skim.

13. Two ply belting for a hay baler comprising:
a first ply comprising a synthetic fabric comprising polyamide warp and polyester weft yarns;
a second ply comprising a synthetic fabric comprising polyester weft and warp yarns said first ply having a greater flex fatique life and modulus of elongation that in said second ply and said second ply having greater load bearing capacity than said first ply;
an inner rubber skim interposed between and bonded to said first and second plys;
a first outer rubber skim having a high coefficient of friction outer surface bonded to said first ply; and
a second outer rubber skim bonded to said second ply.

14. The belting of claim 13 wherein the thickness of said second outer rubber skim is between about 20 and 200 thousandths of an inch.

15. The belting of claim 12 or 14 wherein the thickness of said first outer rubber skim is from about 1 to 5 times the thickness of said second outer rubber skim.

* * * * *